US00RE35774E

United States Patent [19]

Moura et al.

[11] E

Patent Number: Re. 35,774

[45] Reissued Date of Patent: Apr. 21, 1998

[54] REMOTE LINK ADAPTER FOR USE IN TV BROADCAST DATA TRANSMISSION SYSTEM

[75] Inventors: Eduardo J. Moura, San Jose; James C. Long, Sunnyvale, both of Calif.

[73] Assignee: Hybrid Networks, Inc., Cupertino, Calif.

[21] Appl. No.: 340,733

[22] Filed: Nov. 16, 1994

Related U.S. Patent Documents

Reissue of:

[64] Patent No.: 5,347,304
Issued: Sep. 13, 1994
Appl. No.: 98,764
Filed: Jul. 28, 1993

U.S. Applications:

[63] Continuation of Ser. No. 757,151, Sep. 10, 1991, abandoned.

[51] Int. Cl.[6] ..... H04H 1/00

[52] U.S. Cl. ..... 348/12; 348/13; 348/17; 455/5.1; 455/6.1

[58] Field of Search ..... 495/4.2, 5.1, 6.1, 495/6.2, 6.3; 348/1, 12–13, 15, 17; 375/36; 370/73, 76

[56] References Cited

U.S. PATENT DOCUMENTS

| | | | |
|---|---|---|---|
| 4,538,174 | 8/1985 | Gargini et al. . | |
| 4,623,920 | 11/1986 | Duffresme et al. . | |
| 4,633,462 | 12/1986 | Stifle et al. . | |
| 4,684,981 | 8/1987 | Toyoshima et al. . | |
| 4,792,849 | 12/1988 | McCalley et al. . | |
| 4,823,386 | 4/1989 | Dumbauld et al. | 348/12 |
| 4,829,372 | 5/1989 | McCalley et al. . | |
| 4,829,569 | 5/1989 | Seth-Smith et al. | 348/13 |
| 4,862,268 | 8/1989 | Campbell et al. . | |
| 4,894,789 | 1/1990 | Yee | 455/4.2 |
| 4,926,255 | 5/1990 | Von Kohorn | 348/13 |
| 4,928,177 | 5/1990 | Martinez . | |
| 4,987,486 | 1/1991 | Johnson et al. | 455/5.1 |
| 5,014,125 | 5/1991 | Pocock et al. | 455/4.2 |
| 5,051,822 | 9/1991 | Rhoades . | |
| 5,093,718 | 3/1992 | Hoarty et al. | 348/12 |
| 5,133,079 | 7/1992 | Ballantyne et al. | 455/4.1 |
| 5,181,107 | 1/1993 | Rhoades . | |
| 5,247,347 | 9/1993 | Litteral et al. | 455/4.2 |

FOREIGN PATENT DOCUMENTS

| | | |
|---|---|---|
| 0 144 801 A3 | 6/1985 | European Pat. Off. . |
| 0 401 873 A3 | 12/1990 | European Pat. Off. . |
| 33 12 723 A1 | 10/1983 | Germany . |
| 91/06160 A | 5/1991 | WIPO . |
| WO 94/01280 | 1/1994 | WIPO . |
| WO 94/14282 | 6/1994 | WIPO . |

OTHER PUBLICATIONS

Descriptive Material Describing Row–Grabbing System of Information Retrieval Developed by IDR.

International Business Machines Request for Quotation Dated May 14, 1990.

Letter from Ed Moura to T. Sappington dated Jun. 5, 1990 (Hybrid Networks response to IBM Request for Quotation).

*Primary Examiner*—Chi H. Pham
*Attorney, Agent, or Firm*—Farkas and Manelli

[57] ABSTRACT

A hybrid transmission system is provided to transmit and receive high-speed digital information in the form of variable length packets using standard television practices and components. The basic building block of this hybrid digital transmission system is the device at the remote location that receives the analog broadcast TV-like signal processed by a standard vestigial sideband video modulator. This device decodes the digital information from the signal and then passes it along as digital information to any form of a data terminal equipment or computer.

55 Claims, 10 Drawing Sheets

REMOTE LINK ADAPTER FOR USE IN TV BROADCAST DATA TRANSMISSION SYSTEM

Matter enclosed in heavy brackets [ ] appears in the original patent but forms no part of this reissue specification; matter printed in italics indicates the additions made by reissue.

This is a continuation of application Ser. No. 07/757,151, filed Sep. 10, 1991, now abandoned.

BACKGROUND OF THE INVENTION

This invention relates generally to data transmission by television (TV) broadcast, and more particularly the invention relates to a remote link adapter for use in receiving broadcast data.

At the present time there is no cost effective method of delivering at high-speed packets of digital information to remote locations like homes and mobile vehicles. As used herein, digital information are packets that may contain multimedia data (sound, pictures, text, graphics, video) or executable computer code in addition to addressing status and protocol data. The existing telephone circuits, cellular systems and radio systems are just too slow to be practical and useful in an ever increasing number of digital multimedia applications including graphics, imaging, animation or remote windows. High-speed leased telephone lines and/or high-speed broadband switched digital service, offered by the telephone companies, are too expensive or not yet available to any average user (consumer) or potential user and do not address the needs of mobile users. In addition, all other existing forms of digital transmission techniques to the remote location (also known as the last mile) within any particular metropolitan area are too expensive and impractical to be useful at the present time. Most of these existing forms of high-speed digital transmission to the remote location are well known in the prior art but none of them attempt to use a low-cost, high-speed hybrid transmission scheme as described herein.

There are some existing forms of encoding digital information into the vertical blanking intervals (VBI) of a standard NTSC baseband TV signal, but again, these techniques provide severe difficulties with synchronization and the reception of digital information when it is delivered in the form of variable length data packets. These difficulties translate into higher costs at the receiving site, making those techniques those techniques also impractical when used to broadcast high-speed (greater then 10 Mbps) digital information in the form of variable length packets (also referred to herein as "addressable broadcasting" digital service) at very low cost.

This present invention relates to a very cost effective method of diverting high-speed (e.g., 10 Mega bits per second, Mbps, or higher) digital information in the form of packets to any remote location such as a home, school, office or mobile vehicle using standard TV practices and components and as part of a very comprehensive hybrid transmission system. More particularly, the invention provides a device for receiving broadcast data, transmitting the data to the end user, and communicating as necessary with the information provider.

SUMMARY OF THE INVENTION

Accordingly, an object of the invention is a practical method of transmitting and receiving high speed digital information at remote sites.

Another object of the invention is an adapter for receiving broadcast data.

Briefly, in accordance with the invention, a hybrid transmission system transmits and receives high-speed digital information in the form of [variable length] *data* packets using standard television broadcast practices and components. The basic building block of this hybrid digital transmission system is the remote link adapter device at the remote location that receives the analog or digitally encoded broadcast signal processed by a standard television vestigial sideband video modulator. The device decodes the digital information from the signal and then passes it along as digital information to any form of a data terminal equipment or computer.

The remote link adapter includes a hybrid interface, a user interface, and a control means. The hybrid interface includes a radio modem for receiving the broadcast channel, and an optional return channel having a telephone modem, a radio link interface or a CATV interface for use in an on-demand addressable broadcast system. The user interface can include an Ethernet interface, a personal computer interface (e.g. PC/AT or MAC), or a direct bus into a video game system such as the Nintendo NES or Super NES. The control means includes a microprocessor, memory, and a stored control program.

The invention and objects and features thereof will be more readily apparent from the following detailed description and appended claims when taken with the drawings.

DETAILED DESCRIPTION OF THE ILLUSTRATIVE EMBODIMENTS

Figure 1:
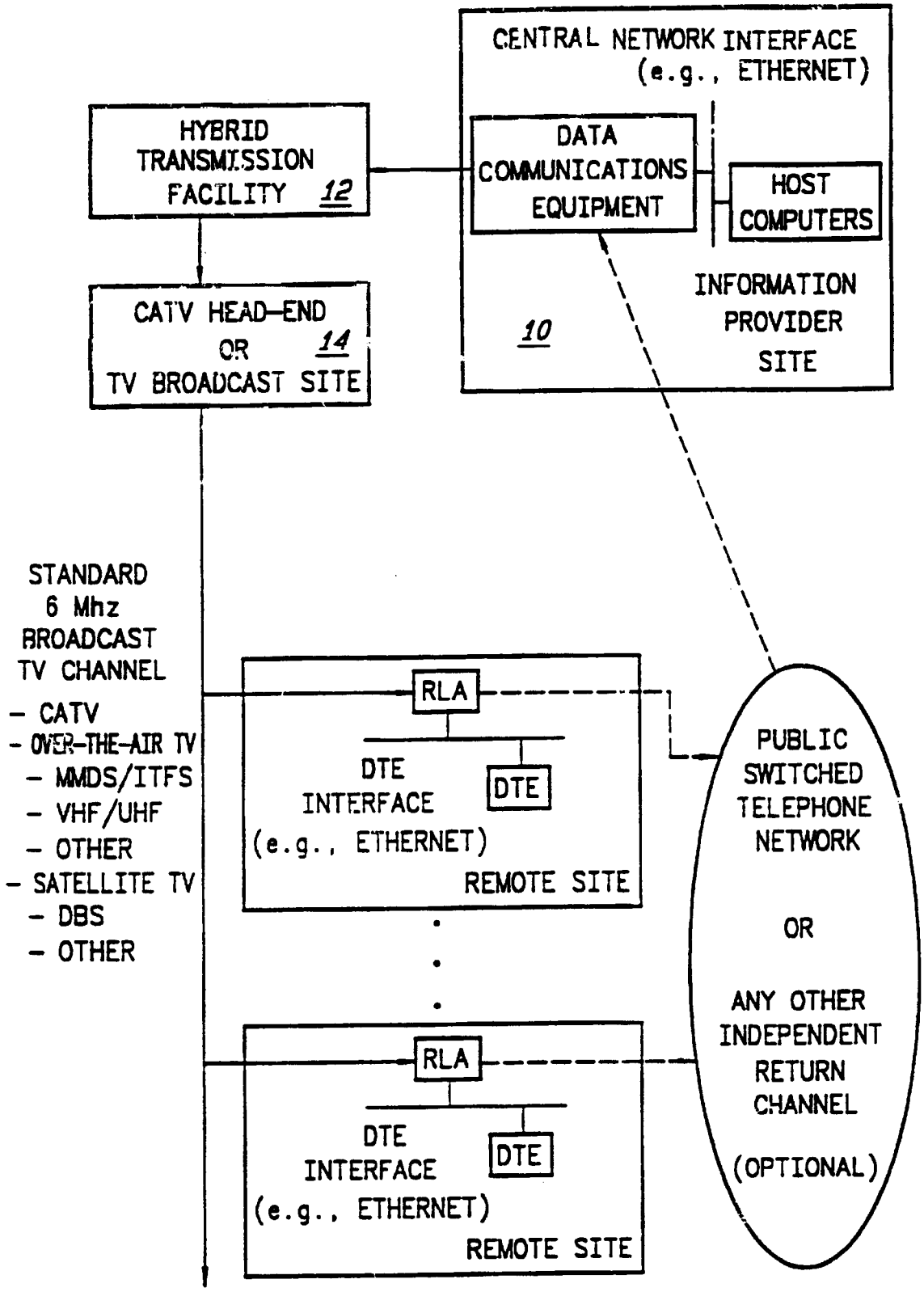
FIG. 1 is a functional block diagram of a data transmission system employing remote link adapters in accordance with the invention.

FIG. 1 is a functional block diagram of a data transmission system for broadcasting data to remote locations and employing remote link adapters in accordance with the invention. The system includes an Information Provider site 10, a Hybrid Transmission facility (HTF) 12, a CATV head-end or TV broadcast site 14 which transmits the data over a standard 6 Mhz television channel, and the Remote sites which receive the incoming digitally encoded broadcast signal.

The central site data communications equipment (DCE) at the Information Provider's site sends a high-speed digital signal to the Hybrid Transmission Facility (HTF) via any suitable high-speed line or media. In the case where the Information Provider's site is co-located with the HTF, the connection between the central site DCE and the HTF can be a short piece of coaxial cable.

The HTF receives the incoming high-speed digital signal, combines it with other incoming high-speed digital signal (using local area network-LAN-based fast-packet switching techniques) to the appropriate outgoing port for broadcasting purposes. The signal is then transmitted to the appropriate head-end location or over-the-air TV broadcast site either as an analog signal or as a digital signal. Again, the head-end site or TV broadcast site could be co-located with the HFT.

Before the digital signal is broadcast over the air or transmitted downstream throughout a cable television (CATV) network, the digital signal is first encoded into a standard 1 volt peak-to-peak, baseband input into a standard video modulator. The signal is then processed by the video modulator just like it processes a standard 1 volt peak-to-peak baseband television input signal and is then transmitted over a standard 6 Mhz television channel.

The Remote Link Adapter (RLA) at the remote site receives the incoming TV-like analog signal using a built-in standard TV tuner/receiver. After processing the signal, the RLA presents the resulting digital signal to the data terminal equipment (DTE) interface. When a return channel is present, the RLA also forwards digital information (packets) to the central site using the return channel. The return channel(s) can be a standard public switched network telephone line(s) operating at a different speed from the forward broadcast channel or any other available channel, such as a radio channel, or the CATV system itself.

Finally, if a remote channel is present, the central site DCE will receive the incoming digital information (packets) from the return channel and forward them to the central network interface to complete the circuit. However, if a return channel is not present, the RLA simply selects digital information (packets) from the high-speed forward broadcast channel based on a specific selection criteria defined by software. A hybrid system as described herein without a return channel is also known as a "selectable addressable broadcast system". A hybrid system as described herein with a return channel is also known as a "on-demand addressable broadcast system." One of the unique characteristics of the hybrid system is that the forward broadcast channel is completely independent from any form of a return channel. This feature allows each channel to be optimized independently from the other.

FIGS. 2–5 are functional block diagrams of embodiments of the RLA. The RLA receives the high-speed analog signal from the 6 Mhz broadcast TV channel, processes the signal and then delivers the resulting digital signal to a specific DTE interface. Physically, the RLA will either be a small standalone box or a printed circuit card (PC board) that can be mounted inside any number of DTE units including computers, workstations, home computers, interactive graphics terminals or simple video game machines.

Figure 2:
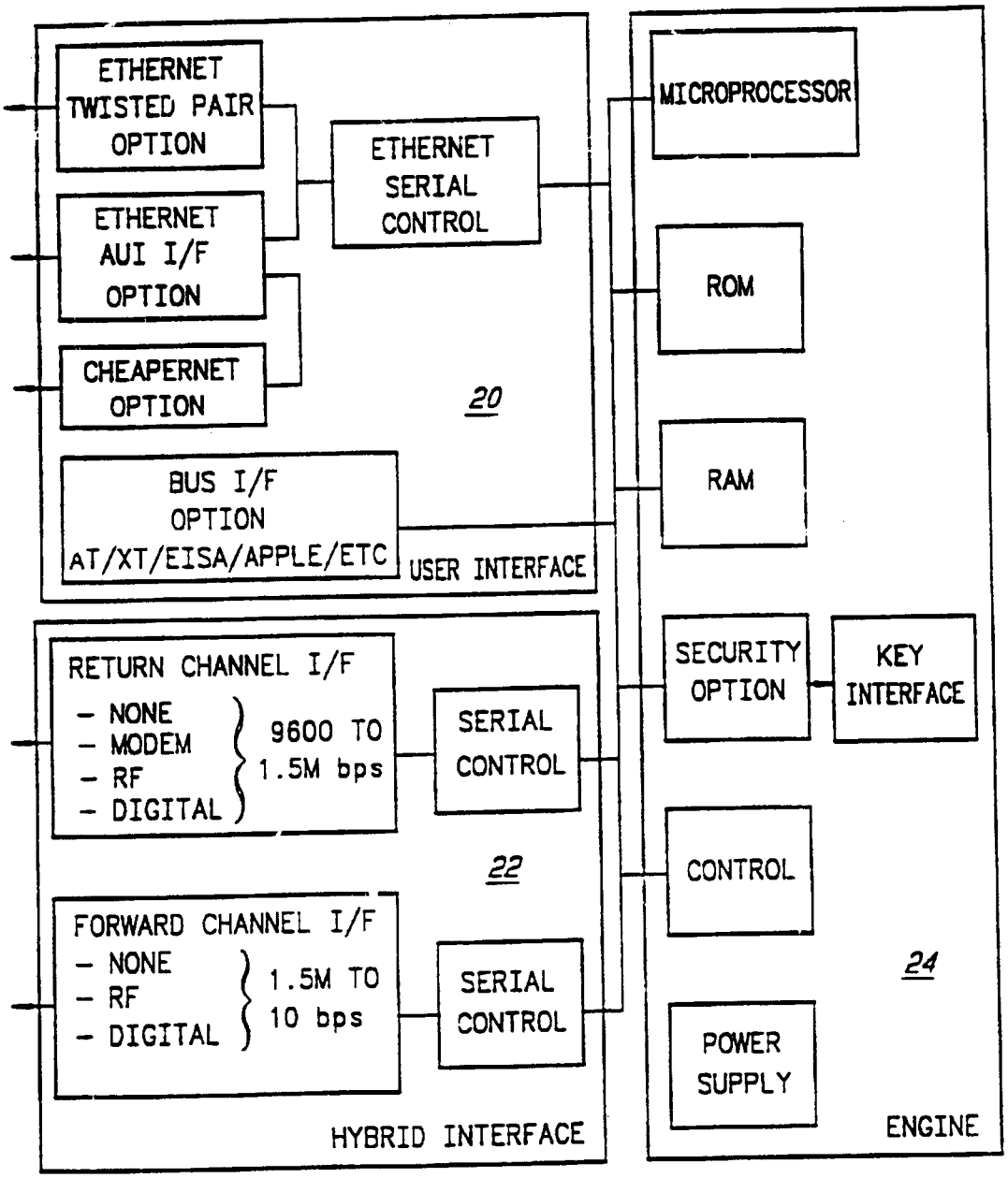
FIG. 2 is a functional block digram of a remote link adapter as used in the system of FIG. 1.

FIG. 2 illustrates the basic building blocks for the RLA. As illustrated, the overall RLA design consists of three basic parts: (1) The User Interface 20 which is also sometimes referred to as The DTE Interface, (2) The Hybrid Interface 22 which includes the forward broadcast channel and an optional return back channel, and (3) The control means or The Engine 24 which includes the microprocessor, memory, control and optional security portions of the RLA.

Figure 3:
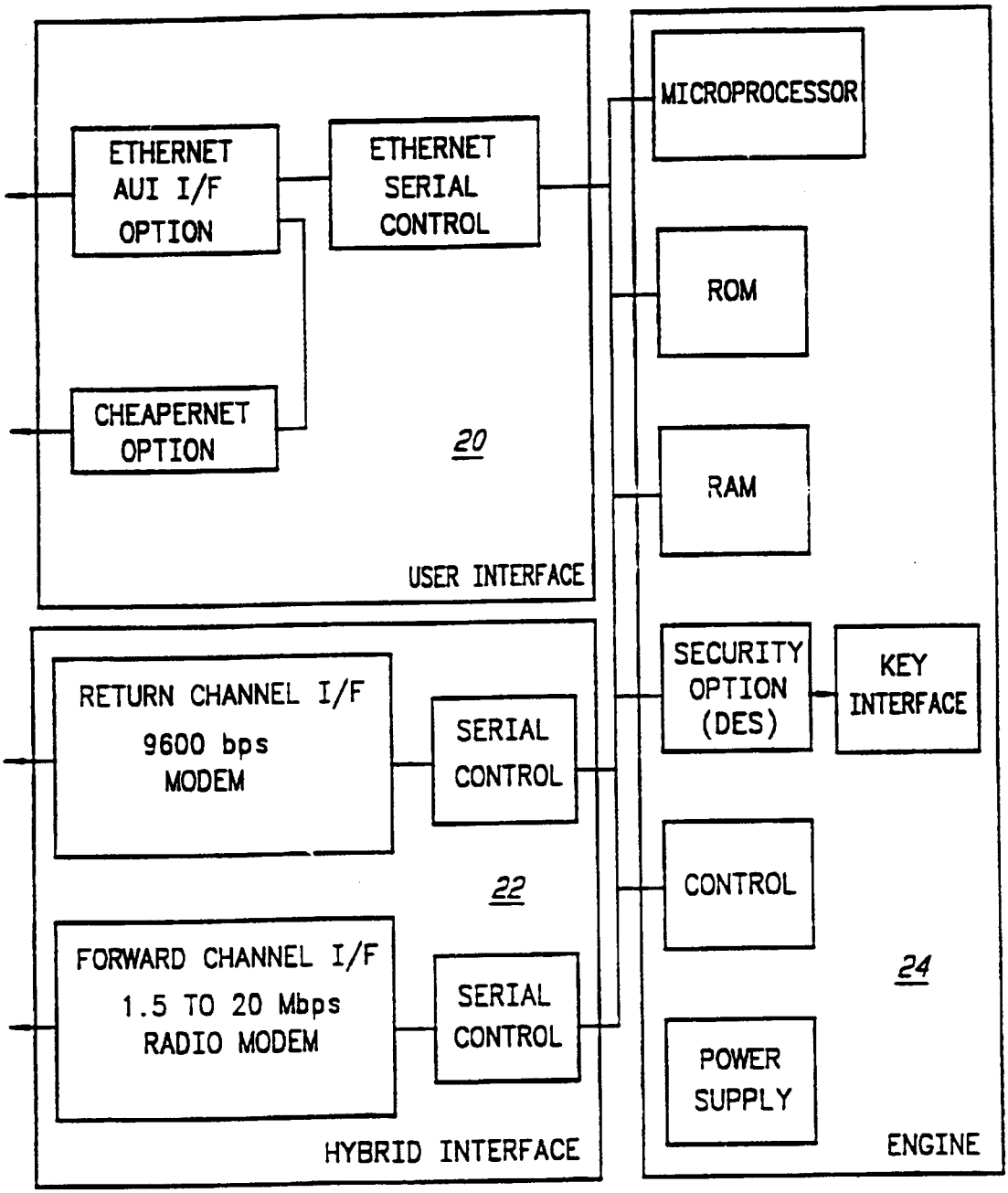
FIGS. 3–5 are functional block diagrams of three different embodiments of the remote link adapter illustrated in FIG. 2.

FIG. 3 illustrates the implementation of a fully configured RLA. In this implementation, the user interface 20 is Ethernet, the hybrid interface 22 is a high-speed (approximately 10 Mbps) RF modem used to receive the forward broadcast channel and a built-in 9600 bps telephone modem used to transmit the return channel. The engine 24 of the RLA is a standard Intel microprocessor with associated read only memory (ROM), random access memory (RAM) and a digital encryption standard (DES) co-processor chip-set used to decipher the incoming distal information from the broadcast channel. This RLA device is a small standalone box with an Ethernet interface, an RF "F" connector interface to receive the high-speed broadcast channel, and an RJ-11 telephone jack used for the return channel.

Figure 4:
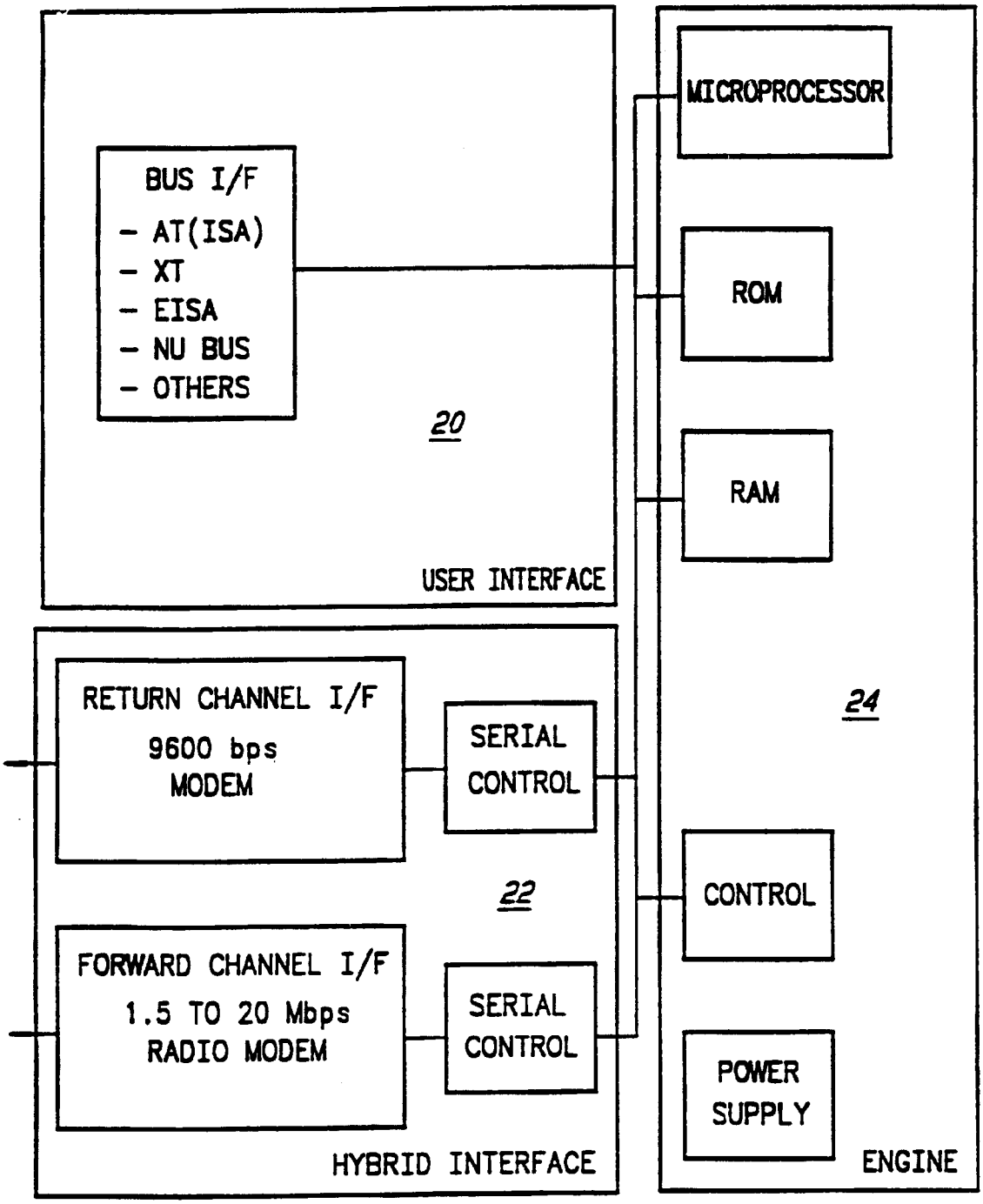

FIG. 4 illustrates the implementation of the RLA for use with a personal computer bus. In this case, the user interface 20 is a direct computer bus interface. The hybrid interface 22 of this embodiment is identical to the implementation of FIG. 2 but the engine 24 is a less capable microprocessor with a smaller amount of ROM and RAM and no encryption co-processor.

This RLA device is a PC board form factor product that interfaces directly with either a PC-AT bus (model 200-001), a MacII bus (model 200-002) or a PS/2 bus (model 200-003). The PC board also provides an RF "F" connector to receive the high-speed broadcast signal and an RJ-11 telephone jack for the return channel.

Figure 5:
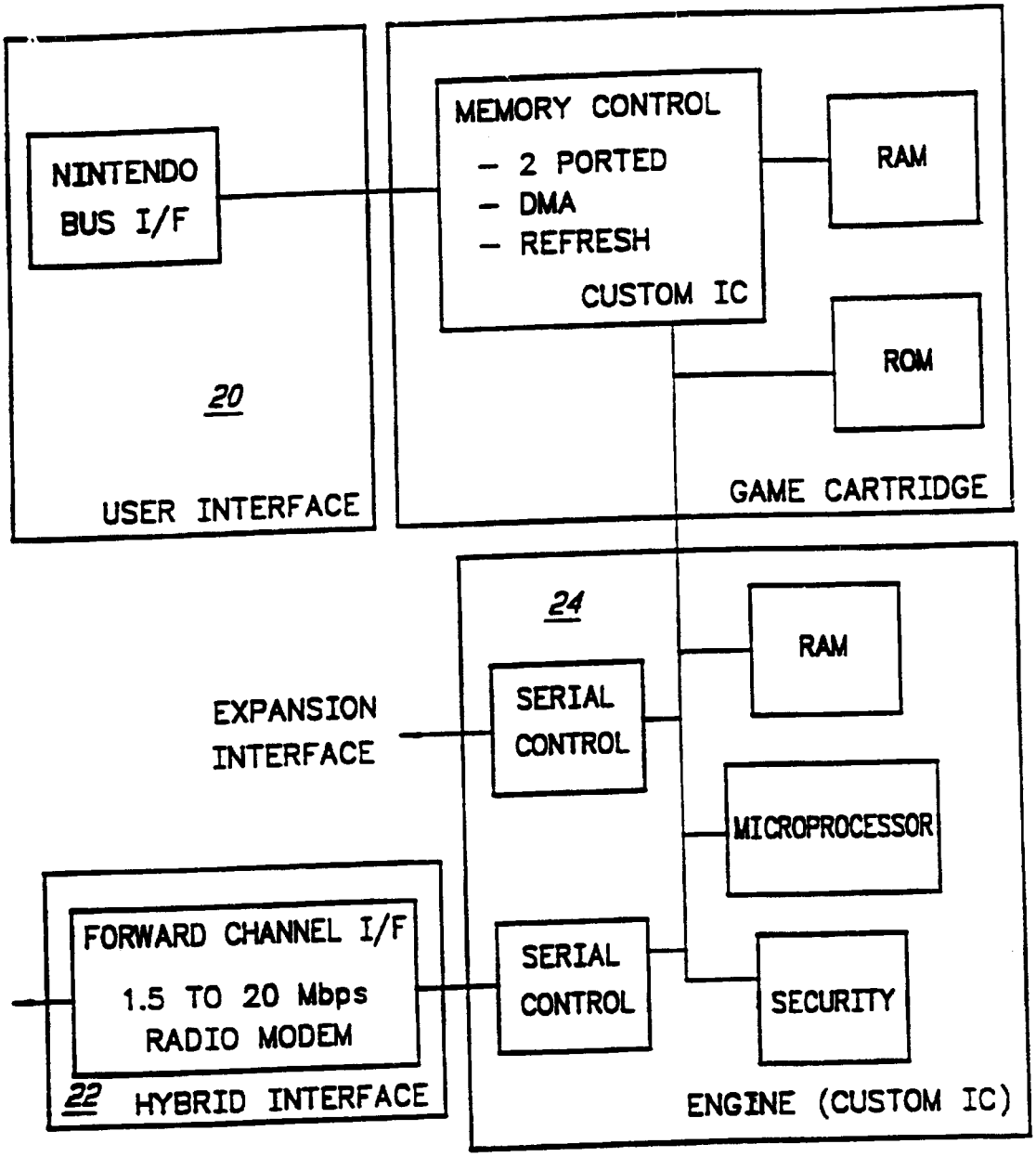

FIG. 5 illustrates the implementation of the RLA for use with a video game machine such as the Nintendo NES or Super NES. This implementation is the lowest cost implementation of the RLA. The user interface 20 is a direct bus interface into the NES or Super NES. In this implementation, the memory and memory control portions of the RLA are implemented in the form of a standard NES or Super NES video game cartridge. The memory control function 24 uses a single VLSI custom chip. The hybrid interface is a very low-cost high-speed (approximately 10 Mbps) RF modem, with no return channel and the engine is another single VLSI custom integrated circuit (IC). Finally, an optional expansion interface is also provided in case a future return channel upgrade is required. The same expansion port may also allow for the attachment of an external printer or an external bulk storage device or other peripherals. This RLA device is packaged in a small plastic enclosure that connects directly to a Nintendo NES or Super NES video game machine. The device provides an RF"F" connector to receive the high-speed broadcast channel and an optional expansion port. A return channel will normally not be available in this RLA implementation.

The RLAs described in accordance with this invention are designed to operate in a hybrid transmission system with a specific forward broadcast ("IN Channel") protocol. The IN Channel protocol specifies the rules used by the RLAs to receive and filter the relevant digital information (packets) flowing in the forward broadcast channel. Each RLA has a unique digitally encoded address. RLAs are capable of receiving broadcast packets, multicast packets (packets addressed to groups of users/RLAs) and packets specifically addressed to them. The forward broadcast channel (IN Channel) is a shared channel. Many RLAs may share the same channel to receive digital information. When an RLA is powered up and the RF modem is appropriately tuned to a particular IN Channel (6 Mhz broadcast TV Channel), the RLA modem automatically synchronizes to the incoming high-speed data being broadcast and starts monitoring (receiving) the incoming signal. The RLA firmware, after its initial power-up and self test sequence, instructs the RLA to look for a particular address or set of addresses (e.g., broadcast packets). Once packets with these addresses are detected, the RLA then forwards the appropriate incoming packets to the DTE for further processing.

Selectable Broadcast—All RLA units receive the main-menu packet from the channel. Then, based on user selections, the RLA units filter the appropriate broadcast packets from the channel in the next broadcasts. Broadcasts are repeated periodically. Based upon the nature of the digital data, certain packets are re-broadcast approximately every other second while other packets are re-broadcast approximately every minute. The information contained in a particular broadcast cycle (sequence of packets) will also change with time.

On-Demand Broadcast—Users request a particular set of information (packets) in accordance with any given data communications protocol supported by The IN Channel. The RLA will support most standard and defacto protocols that run over a standard IEEE-802.3 Ethernet local area network. The following are the different types of on-demand calls that can be set-up using The IN Channel:

a. Broadcast/Multicast—The Information Provider broadcasts or multicasts the information to the particular user or group of users. No call set-up is required. The request for information is completely asynchronous from the delivery of information;

b. Secure Sessions—This is the most complex procedure since it involves the distribution of encryption keys;

c. Non-secure sessions—This procedure is identical to the procedures currently used by existing network applications. The IN Channel is transparent to most LAN-based network applications;

d. Interactive sessions for the Consumers—The procedures are determined by the different information Providers, who decide to use the IN Channel to deliver their services.

For on-demand applications—The RLA shown in FIG. 3 goes through an initial call set-up/security procedure before it becomes operational. First, the user dials a particular telephone number. Dial-back security and user authentication will be optional at this stage. Once the central site DCE (located at the Information Provider's site) answers the call, the RLA goes through a security protocol (encryption key distribution) if used in the system. Next a link layer connection is established between the central site DCE and the remote RLA. This connection remains transparent to the applications running above. The hybrid connection looks like a transparent remote Ethernet bridge and, therefore, is compatible with all upper layer protocols (e.g., TCP/IP, AppleTalk, ISO, DECNET, etc.) that can run over Ethernet. Once the connection is established, the remote user can now run standard network applications just as if the user were located at the central site local area network. The hybrid connection is terminated by hanging up the telephone side of the connection (the return channel).

The RLA shown in FIG. 4 series also goes through an initial call set-up procedure before it becomes operational. Again, first, the user dials a particular telephone number. Dial back security and user authentication will be optional at this stage. Once the central site DCE answers the call, a link layer connection is established between the central site DCE and the remote RLA. Since the remote RLA is a PC board that fits inside a particular personal computer, specific network driver software is required by the RLA. Network applications need to be ported to the hybrid network driver in order to be able to run over the hybrid connection.

The RLA shown in FIG. 5 normally does not go through a call set-up procedure since no return channel is used. This embodiment operates in accordance with the IN Channel protocol.

The IN Channel uses a protocol that controls the flow of information and the addressing in the channel. All RLAs will have a unique address. In addition, the RLAs will also be able to receive broadcast and multicast messages (packets). The following is a list of the different types of packets that can flow in the IN Channel:

1. Broadcast packets (including selectable broadcast packets)
2. Multicast packets
3. On-Demand Addressable packets
   Secure Packets
   Non-secure Packets
   Network Management Packets
4. Addressable video frame packets (followed by one or more NTSC video frames)

The channel transports variable length data packets. Packet multiplexing techniques are primarily based on a FIFO (first in first out) scheme as a direct feed from a LAN Switch port. A priority scheme is given to certain packets, including selectable broadcasts and some network management packets. The IN Channel operates in a synchronous mode. Both on-demand and selectable broadcast traffic is transported in the IN Channel at the same time. Bandwidth management is performed by the equipment at the Hybrid Regional Distribution Centers.

The digital information (packets) carried by The IN Channel ate transparent to the applications. Standard upper-layer protocols such as: TCP/IP, NFS, X-Windows, AppleTalk, Netware and ISO will be able to run unchanged over the IN Channel. However, upper-layer protocol optimization and/or new upper-layer protocols may be used for consumer-based applications.

The information flowing in The IN Channel is packaged in packets. Each packet contains the address of the subscriber (destination address) and the source address (optional). LAN-based fast packet switching and multiplexing techniques will be used to process and transport information in the channel. Off-the-shelf packet switching equipment can be used at the regional distribution centers.

The hybrid data transmission system return channel is optional. It needs to be used, however, when running real-time interactive applications. The return channel protocol provides data compression needed to improve the performance of high-speed interactive applications.

The packet-data delivery via The IN Channel has a specific error rate. The IN Channel is a datagram, packet-based transport system. This system relies on the bandwidth and services provided by the CATV (cable or wireless) operators. Error recovery is achieved by the end-to-end transport layer protocol running in the data terminal equipment (DTB). A good example here is TCP/IP. For selectable traffic, packets with CRC errors will be dropped. They will be received by the RLA on the next re-broadcast.

Figure 6:
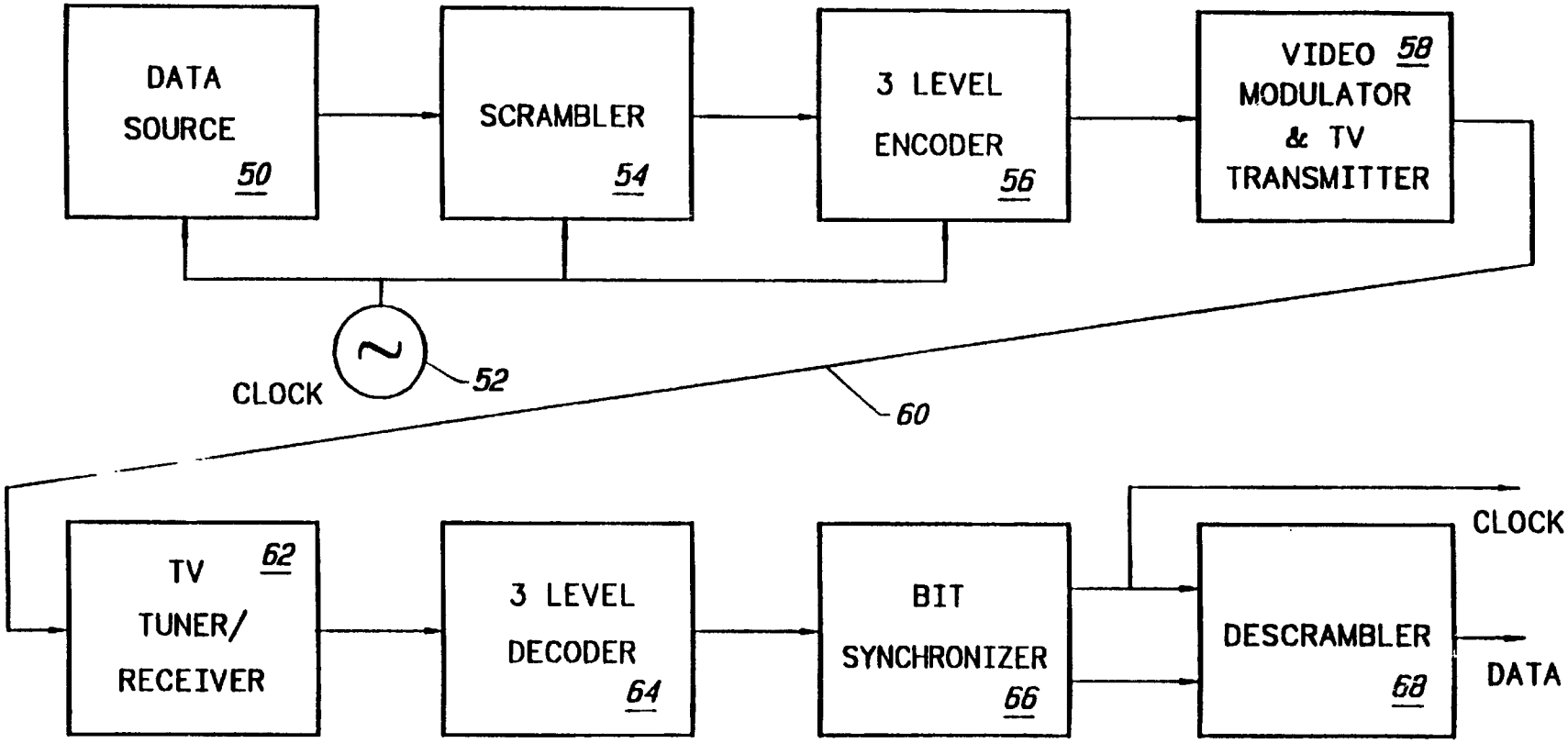
FIG. 6 is a functional block diagram of the RF portion of the data transmission system of FIG. 1.

FIG. 6 shows the signal path from the head end cable TV transmitter site to a typical terminal. The system translates between NRZ baseband digital stream at the input to a modulation form suitable for use on a standard CATV head end modulator, and translates the received signals from a standard TV tuner connected to a cable TV network to baseband NRZ data stream and a regenerated clock. A TV tuner containing only those features required for receiving the digitally modulated CATV signal is used. The design is adaptable to a range of bit rates.

The data source 50 can be any baseband NRZ data stream. The clock 52 can be part of the system or supplied by the data source. The scrambler 54 takes a data stream supplied by the user and exclusively ORs the stream with a pseudo-random pattern which is a function of the past data. This breaks up periodic bit patterns which would degrade the bit synchronizer functioning.

The 3 level encoder 56 takes in a NRZ bit stream and clock and converts it to a more bandwidth efficient class IV partial response 3 level format. The output is not bandwidth limited because the CATV modulator contains SAW filters that produce the bandwidth limiting without any added phase distortion. A format that does not contain spectral terms at DC is used so that the CATV modulator and tuner not having a frequency response down to DC will not be a hindrance. The TV transmitter 58 is a standard unit commonly used in CATV or over the air TV systems. It takes a baseband video signal and converts it to any commonly used TV format or digitally encoded vestigial sideband signal.

The TV distribution network 60 can be any distribution system used to distribute TV signals. It can be electrical cable, optical cable, or over the air radio or microwave or direct broadcast satellite. The broadcast signal containing the data is converted to baseband by a TV tuner 62 with only those portions necessary to receive the digitally modulated signal from the TV distribution network and produce a baseband video output consisting of the 3 level baseband signal. The 3 level decoder 64 takes the 3 level signal from the video output of the TV tuner 62 and converts it into two level NRZ data using a clock produced by the bit synchronizer 66. The bit synchronizer 62 regenerates the data clock from the video output of the TV tuner. The descrambler 68 takes in the data stream from the scrambler (after being modulated, transmitted, received, and demodulated by the RF components) and recovers the original data stream.

Figure 7A:
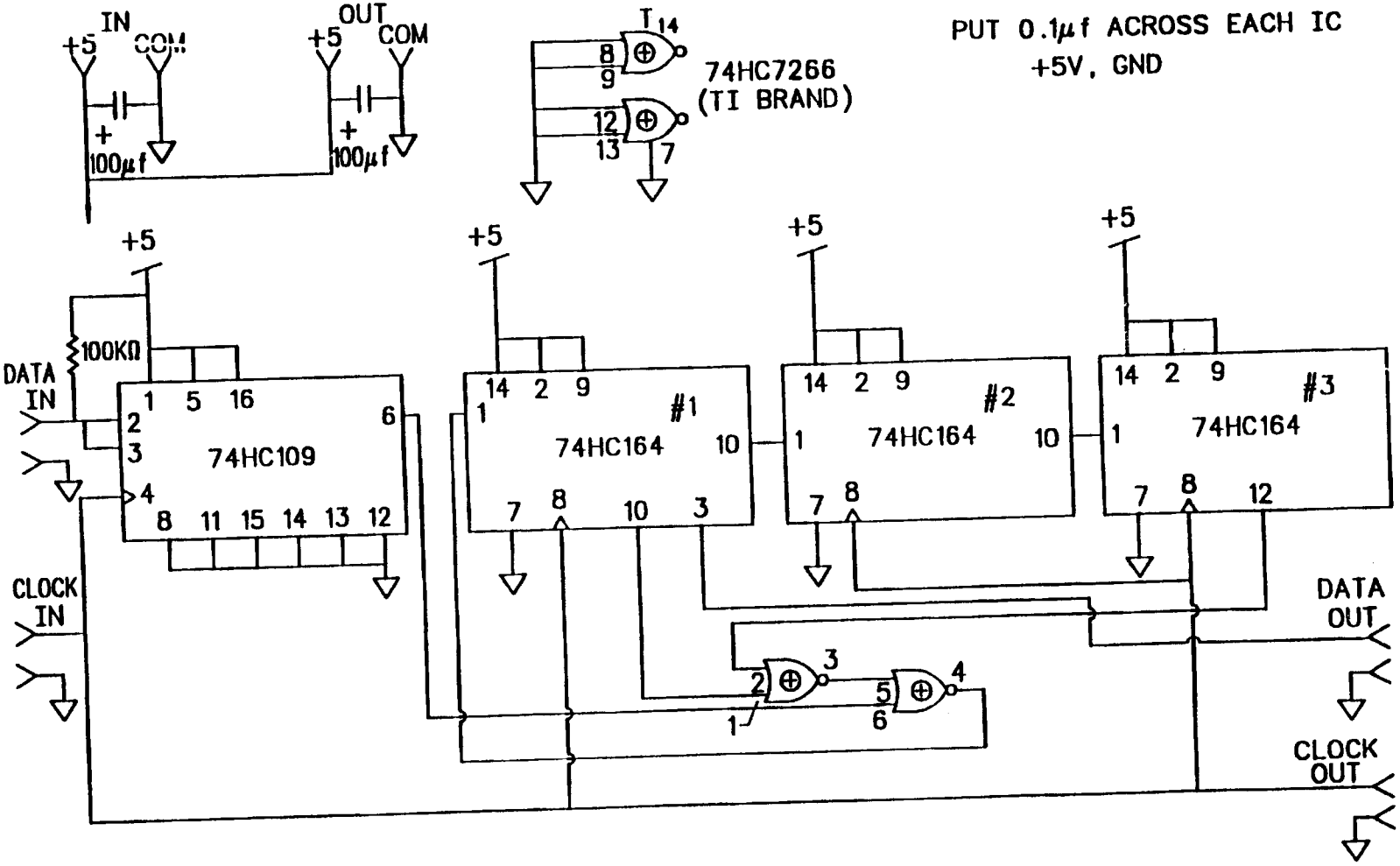
FIG. 7A is a schematic of a data scrambler and FIG. 7B is a schematic of a data descrambler as used in FIG. 6.

FIG. 7A is a schematic of one embodiment of the scrambler. The scrambler takes input data and XORs the data with a 23 bit PRNG sequence to make it more random. The circuit is designed as a two port network. Clock and data go to the input, and clock and scrambled data come from the output which matches the inputs on the 3 level encoder. The circuit performs an additional function as a test pattern generator. The pull up resistor on the data input provides all ones which produces a PRNG output.

Figure 7B:
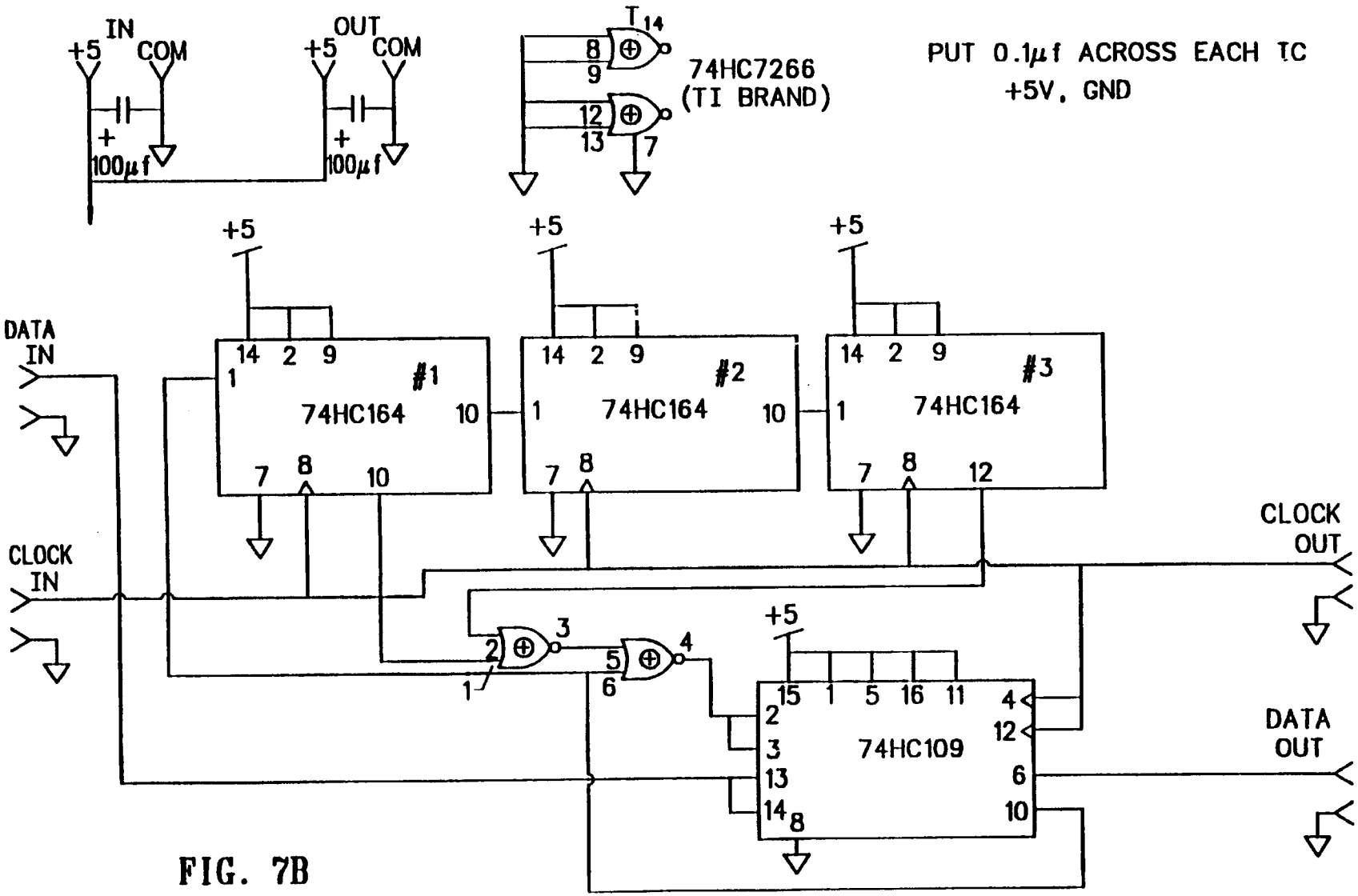

The descrambler shown schematically in FIG. 7B performs the inverse function of the scrambler. It is designed as a two port network with clock and scrambled data going in the input, and clock and data coming from the output.

Figure 8A:
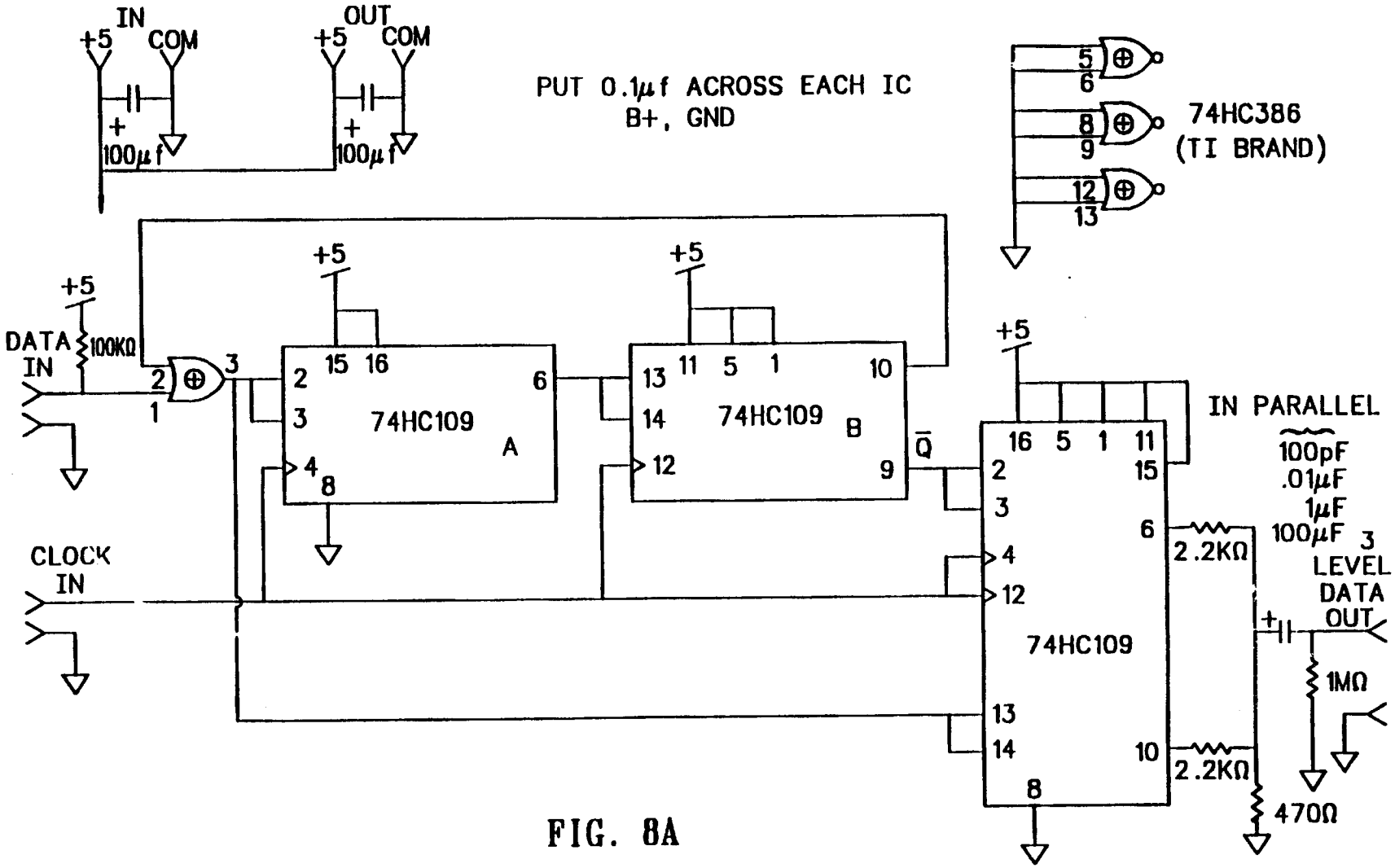
FIG. 8A is a schematic of a three level decoder.

FIG. 8A is a schematic of the three level encoder. It uses class 4 duobinary encoding format created by subtracting a 2 bit delayed version of the input from itself. A zero input produces a middle level output and a one input produces one of the extreme levels. The second and subsequent one in a sequence keeps the output at the same level as caused by the first one.

Figure 8B:
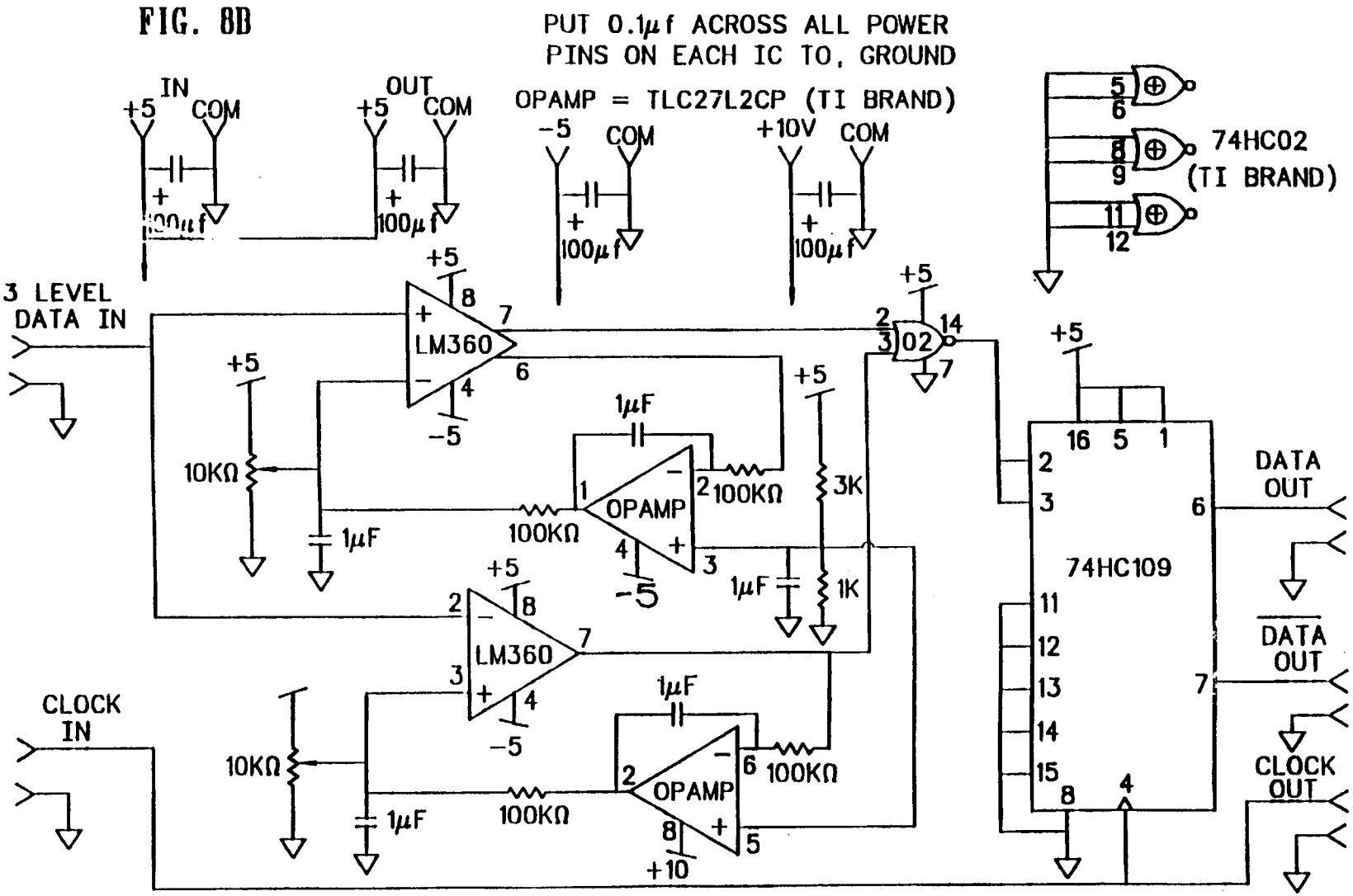
FIG. 8B is a schematic of a three level decoder as used in FIG. 6.

FIG. 8B is a schematic of the three level decoder. It uses comparators to detect the three levels. The voltage levels for comparison are set by a combination of two items. The first is a factory set trimpot. Small adjustments around this value are set by a feedback network that tries to make the two extreme voltage level outputs (ones) occur 25% of the time. This is the situation that exists with random data such as produced by scrambled data. The data is sampled at the proper time by a locally regenerated clock.

There has been described a Remote Link Adapter used to receive high speed data transmitted by television broadcast. The RLA can be employed in interfacing with a LAN, an individual personal computer, or a video game machine. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In a high speed digital information transmission system in which multi megabit per second digital data is [addressably] broadcast using [contiguous] *a continuous transmission that includes address information in* bandwidth in *at least a portion of the spectrum* of a television channel to a remote site, a remote link adapter comprising a hybrid interface for [receiving] *detecting* and demodulating a multi megabit per second digitally encoded signal to verify an address *indicative of said remote link adapter* and obtain [the] transmitted digital data *in accordance with detection of said address*, said hybrid interface providing a [full duplex] *two way* asymmetric network connection which is constructed from independent forward and return transmission channels in two directions, a user interface for providing said digital data to data terminal equipment, a microprocessor [control means] *controller* for controlling said hybrid interface in accordance with protocols for controlling the flow of said digital data and [the] addressing in the forward and return transmission channels, and a bus interconnecting said user interface, said hybrid interface, and said microprocessor [control means] *controller*.

2. The remote link adapter as defined by claim 1 wherein said return channel includes a telephone line modem.

3. The remote link adapter as defined by claim 1 wherein said return channel includes a radio interface.

4. The remote link adapter as defined by claim 1 wherein said return channel includes a CATV interface.

5. The remote link adapter as defined by claim 1 wherein said user interface includes an Ethernet interface, said digital data are broadcast at multi megabit per second data rates using the frequency spectrum of a 6 MHz television channel, and said return channel is provided by an independent transmission path with data transmission rates of at least 9600 bits per second whereby said remote link adapter operates in a high speed asymmetric data transmission system.

6. The remote link adapter as defined by claim 1 wherein said user interface includes a personal computer bus interface.

7. The remote link adapter as defined by claim 1 wherein said user interface interfaces with a video game system.

8. The remote link adapter as defined by claim 1 wherein said hybrid interface includes an RF modem.

9. The remote link adapter as defined by claim 1 wherein said microprocessor [control means] *controller* controls the addressing of said hybrid interface and the flow of data in said bus to any number of multiple users connected to the user interface.

*10. In a high speed digital information transmission system in which multi megabit per second digital data is transmitted using continuous transmissions that include address information in any portion of bandwidth a television channel to a remote site, said system comprising a remote computer and a remote link adapter for interconnecting said remote computer to an asymmetric network, said adapter comprising:*

*a hybrid interface for demodulating a multi megabit per second digitally encoded signal to obtain transmitted digital data, said hybrid interface providing a two way asymmetric network connection which is constructed of independent transmission channels in two directions,*

*a user interface for providing digital data from said digitally encoded signal to said remote computer,*

*a microprocessor controller for controlling said hybrid interface to control the flow of digital data in the transmission channels,*

*a bus interconnecting said remote computer, user interface, said hybrid interface and said microprocessor controller, and*

*said digitally encoded signal includes address information associated with said remote computer and said microprocessor controller controls the flow of digital data in accordance with said address information.*

*11. A method for transmitting multi megabit per second digital data in a high speed digital information transmission system including a microprocessor connected to control a hybrid interface, the method comprising the steps of:*

*transmitting a multi megabit per second digitally encoded digital data signal to a remote site using continuous transmissions that include address information in any portion of bandwidth of a television channel;*

*forming with the hybrid interface a two way asymmetric network including independent forward and return channels in two directions;*

*demodulating at the remote site said multi megabit per second digitally encoded data signal transmitted in the forward channel of the television channel and received by the hybrid interface to obtain transmitted digital data;*

*supplying demodulated digital data to data terminal equipment; and*

*controlling the flow of digital data in the forward and return channels in accordance with address information detected in said digitally encoded data signal, said address information being indicative of said remote site.*

*12. The method according to claim 11 in which digital data flows in a return channel including a selected one of telephone lines, a radio channel, an Ethernet channel, and a CATV channel.*

*13. The method according to claim 11 in which in the step of transmitting, digital data is transmitted at multi megabit per second data rates using any portion of the frequency spectrum of a 6 MHz bandwidth of a television channel; and*

*in the step of controlling, the flow of digital data in the return channel operates at a rate of at least 9600 bits per second in asymmetric transmission relative to the rate of digital data in the forward channel.*

*14. The method according to claim 11 further including the steps of:*

*detecting an address and demodulating digital data; and*

*transmitting the digital data to at least one data terminal in response to the address.*

*15. A high speed digital information transmission system comprising:*

*a source of multi megabit per second digital data for transmission to a number of remote sites;*

*a hybrid transmission facility including a number of video modulators connected to receive the digital data for encoding the digital data to produce an analog RF signal for transmission to the number of remote sites using bandwidth in any portion of a television channel;*

*and at each of the number of remote sites;*

*a remote link adapter including a hybrid interface for detecting and demodulating said analog RF signal to obtain data from said source of multi megabit per second digital data, said hybrid interface providing a two way asymmetric network connection including independent forward and return transmission channels in two directions;*

*circuit connections of the return transmission channel of the remote link adapter to the hybrid transmission facility;*

*a user interface for providing digital data to data terminal equipment;*

*microprocessor controller for controlling said hybrid interface to control the flow of digital data in the forward and return transmission channels; and*

*a signaling bus interconnecting said user interface, said hybrid interface and said microprocessor controller.*

*16. The system according to claim 15 in which the return channel for digital data includes a selected one of telephone lines, a radio channel, an Ethernet channel and a CATV channel.*

*17. The system according to claim 15 in which digital data is transmitted at multi megabit per second data rates using the frequency spectrum within a 6 MHz bandwidth of a television channel; and*

*the return transmission channel operates at a rate of at least 9600 bits per second in asymmetric transmission relative to the rate of digital data in the forward channel.*

*18. The system according to claim 15 wherein the hybrid transmission facility receives address information for the remote sites, and the modulators encode the address information and the digital data to produce said analog RF signal for transmission to at least one of the remote sites.*

*19. The system according to claim 15 in which the remote link adapter detects an address and demodulates the digital data for transfer to the data terminal equipment at the remote site.*

*20. A method for high speed reception of digital information at a number of remote locations having hybrid interfaces thereat, the method comprising the steps of:*

*receiving a source of multi megabit per second digital data for transmission to a number of remote sites;*

*modulating the digital data for encoding the digital data to produce an analog signal for transmission from a hybrid transmission facility to at least one of the remote sites using bandwidth in any portion of a television channel;*

*forming with the hybrid interfaces a two way asymmetric network including independent forward and return channels in two directions;*

*demodulating the encoded digital data transmitted in the forward channel on the television channel and received by the hybrid interface to obtain the transmitted digital data;*

*supplying the demodulated digital data to data terminal equipment at the remote site;*

*supplying digital data over the return transmission channel from a remote site to the hybrid transmission facility; and*

*controlling the flow of digital data at the remote site in the forward and return transmission channels.*

*21. The method according to claim 20 in which digital data flows from a remote site to the hybrid transmission facility in a return channel including a selected one of telephone lines, a radio channel, an Ethernet channel and a CATV channel.*

22. The method according to claim 20 in which in the step of receiving, digital data is received at multi megabit per second data rates using the frequency spectrum within a 6 MHz bandwidth of a television channel; and in the step of controlling digital data in the return transmission channel is controlled at a rate of at least 9600 bits per second in asymmetric transmission relative to the rate of digital data in the forward channel.

23. The method according to claim 20 in which in the step of receiving, the digital data includes encoded address data, and the step of demodulating obtains an address and includes the steps of;

detecting the address with demodulated digital data; and transmitting digital data to at least one data terminal equipment in response to the demodulated address data.

24. The method according to claim 20 in which the interfaces detect address information and demodulate the analog signal for transfer of digital data to the data terminal equipment at the remote site.

25. A two way interactive communication system comprising:

a host computer and a remote user station wherein said host computer includes a source of data for being transmitted to said remote user station;

an asymmetric network interconnecting communication paths of said host computer and said remote user station, said asymmetric network comprising a high speed forward channel and a lower speed return channel, said forward and return channels cooperatively providing interactive two way communication between said host computer and said remote user station in accordance with a forward channel protocol and a return channel protocol;

a host interface connected with said host computer, said host interface including:

a controller for receiving data from said source of data and for effecting multi megabit per second transfers of data from said host interface in accordance with said forward channel protocol;

a modulator connected with said controller for modulating a broadband signal with said multi megabit per second data;

and a transmitter connected with said modulator for transmitting a broadband signal carrying said multi megabit per second data over the forward channel of said asymmetric network; and a remote interface connected with said remote user station, said remote interface including:

a broadband receiver for receiving said broadband signal transmitted over said forward channel;

a demodulator for demodulating said broadband signal thereby to extract data from said broadband signal that carries said multi megabit per second data; and a controller connected with said demodulator for producing representations of data transmitted from said host computer in accordance with said forward channel protocol.

26. The two way interactive communication system as recited in claim 25, wherein said remote interface further includes a modulator for modulating data transmitted from said remote user station, a transmitter connected with said modulator for supplying a return signal to said return channel of said asymmetric network, and a microprocessor that controls the transfer of data from said remote user station to said return channel in accordance with said return channel protocol, and said host interface further includes a receiver that receives information from said remote user station transmitted over said return channel, a demodulator connected with said receiver for demodulating information transmitted over said return channel, and controller of said host interface includes a microprocessor that produces representations of data transmitted over said return channel from said remote user station in accordance with said return channel protocol.

27. The interactive communication system as recited in claim 25 wherein the forward channel and the return channel of said asymmetric network are independent in a common physical transmission medium, and wherein said controller of said host interface defines the forward protocol in the forward channel and said controller of said remote user station defines the return channel protocol of said asymmetric network.

28. The interactive communication system as recited in claim 27 wherein each of the forward and return channels of said asymmetric network physically reside on a selected one of a CATV cable channel, an over-the-air radio channel and a broadcast satellite channel.

29. The interactive communication system as recited in claim 25 wherein said asymmetric network comprises at least two physically separate media and said controller of said host interface defines said forward channel protocol in one direction on a first of said media and said controller of said remote user station defines said return channel protocol in an opposite direction on a second of said media.

30. The interactive communication system as recited in claim 29 wherein each of the forward and return channels of said asymmetric network physically resides on a selected one of a CATV cable channel, an over-the-air radio channel, and a broadcast satellite channel.

31. The interactive communication system as recited in claim 25 wherein said controller of said host interface that defines a forward channel protocol provides for assembling a series of data packets including source data from said host computer and for effecting the transmission of said series of data packets over said forward channel, said series of data packets comprising a main menu packet that identifies the nature of information contained in a subsequent data packet, and said controller of said remote interface being responsive to said menu packet and user selection criteria thereby to select information contained in said subsequent data packet.

32. The interactive communication system as recited in claim 25 wherein said remote interface has a unique address and said controller of said host interface transmits data packets having address information that is recognized by said remote interface for reception of information.

33. In an interactive communication system for providing two way communications between a host computer and a remote user station, said remote user station including a remote interface associated therewith that includes a broadband receiver for detecting multi megabit per second data transmitted over a forward channel in a broadband signal, a demodulator for demodulating said broadband signal, and a controller connected with said demodulator for producing representations of at least a portion of data transmitted from said host computer, the improvement comprising:

an asymmetric network that includes a high speed forward channel and a lower speed return channel wherein said forward and return channels cooperatively provide two way interactive communication

*between said host computer and said remote user station in accordance with a forward channel protocol and a return channel protocol,*

*a host interface including a controller for receiving data from a source of data and for effecting multi megabit per second transfers of data originating from said host computer over said forward channel in accordance with said forward channel protocol, a modulator connected with said controller for modulating a broadband signal with said multi megabit per second data, and a transmitter connected with said modulator for transmitting a modulated broadband signal over the forward channel of said asymmetric network, and*

*said remote user station further includes unique address information associated therewith and said controller of said remote interface operates to detect said unique address information by demodulating a broadband signal carrying multimegabit per second data.*

*34. In an interactive communication system for providing two way communications between a host computer and a remote user station, the improvement comprising:*

*an asymmetric network including a high speed forward channel and a lower speed return channel wherein said forward and return channels cooperatively provide two way interactive communication between said host computer and said remote user station in accordance with a forward channel protocol and a return channel protocol,*

*a host interface including a controller for receiving data from a source of data and for effecting multi megabit per second transfers of data originating from said host computer in accordance with said forward channel protocol, a modulator connected with said controller for modulating a broadband signal with said multi megabit per second data, and a transmitter connected with said modulator for generating a broadband transmission carrying multi megabit per second data for transmission over the forward channel of said asymmetric network, and*

*a remote interface including a broadband receiver for detecting said broadband transmission carrying multi megabit per second data transmitted over said forward channel, a demodulator for demodulating said broadband transmission, and a controller connected with said demodulator for producing representations of data originating from said host computer and transmitted over said forward channel in accordance with said forward channel protocol.*

*35. A method of providing two way interactive communication between a host computer and a plurality of remote user stations across a broadband communication medium which includes independent forward and return channels in an asymmetric network configuration, wherein at least one of said remote user stations has a unique address, said method comprising the steps of:*

*transmitting over said medium a broadband signal carrying multimegabit per second data in said forward channel of said asymmetric network from said host computer to a remote user station in accordance with a forward channel protocol;*

*transmitting return channel signals over said medium from at least one of said remote user stations to said host computer in accordance with a lower speed return channel protocol,*

*controlling the transfer of data between said host computer and said at least one of said remote user stations in accordance with said forward and return channel protocols, said controlling including the steps of:*

*generating a data packet containing source information to be transferred from said host computer and address information which identifies a unique one of the remote user stations,*

*broadcasting said data packet over said forward channel, and*

*detecting said data packet at a uniquely addressed remote user station and selecting source information contained in said packet.*

*36. A method of providing two way interactive communication between a host computer and a plurality of remote user stations across a broadband communication medium which includes independent forward and return channels in an asymmetric network configuration, wherein at least one of said remote user stations has a unique address, said method comprising the steps of:*

*transmitting over said medium a broadband signal carrying multi megabit per second data in said forward channel of said asymmetric network from said host computer to said plurality of remote user stations in accordance with a forward channel protocol,*

*transmitting return channel signals over said medium from said plurality of remote user stations to said host computer in accordance with at least one lower speed return channel protocol, and*

*controlling the transfer of data between said host computer and said remote user stations in accordance with said forward and return channel protocols, said controlling including the steps of:*

*generating a multibit data packet containing source information to be transferred from said host computer, address information which identifies a unique one of the remote stations and variable length information defining the length of source information contained in said data packet,*

*broadcasting said data packet over said forward channel, and*

*detecting said data packet at a uniquely addressed remote user station and selecting information contained in said packet in accordance with length information provided in said data packet.*

*37. The method as recited in claim 35 further comprising the step of providing said medium from a selected one of an over-the-air broadcast medium, a CATV cable medium, a coaxial cable and a fiber optic cable as the broadband communication medium.*

*38. The method as recited in claim 36 further comprising the step of providing said medium from a selected one of an over-the-air broadcast medium, a CATV cable medium, a coaxial cable and a fiber optic cable as the broadband communication medium.*

*39. The method as recited in claim 35 further comprising the steps of providing the forward channel from a selected one of an over-the-air broadcast medium, a CATV medium, a coaxial cable and a fiber optic cable; and providing the return channel from another selected one of an over-the-air broadcast medium, a CATV medium, a coaxial cable and a fiber optic cable.*

*40. The method as recited in claim 36 further comprising the steps of providing the forward channel from a selected one of an over-the-air broadcast medium, a CATV medium, a coaxial cable and a fiber optic cable; and providing the return channel from another selected one of an over-the-air broadcast medium, a CATV medium, a coaxial cable, and a fiber optic cable.*

*41. A communication system for providing two way interactive communication between a host computer and a plurality of remote user stations wherein at least one of said remote user stations has a unique address, said system comprising:*

*a broadband communication medium which includes independent forward and return channels in an asymmetric network configuration,*

*a multi megabit per second forward channel protocol defined in the forward channel of said asymmetric network for carrying information signals in a broadband signal transmitted over said broadband communication medium from said host computer to said plurality of remote user stations,*

*a lower speed return channel protocol defined in said return channel of said asymmetric network for transferring data from at least one of said plurality of said remote user stations to said host computer,*

*a controller for controlling the transfer of information signals between said host computer and at least one of said remote user stations in accordance with said forward and return channel protocols, said controller including circuitry for generating a multibit data packet containing source information to be transferred from said host computer and address information which identifies a unique one of the remote user stations, and*

*said remote user station including circuitry for detecting said data packet at a uniquely addressed remote user station.*

*42. A communication system for providing two way interactive communications between a host computer and a plurality of remote user stations wherein at least one of said remote user stations has a unique address, said system comprising:*

*a broadband communication medium which includes independent forward and return channels in an asymmetric network configuration,*

*a multi megabit per second forward channel protocol defined in the forward channel of said asymmetric network for carrying information signals in a broadband signal transmitted over said broadband communication medium from said host computer to said plurality of remote user stations,*

*a lower speed return channel protocol defined in said return channel of said asymmetric network for transferring information signals from at least one of said remote user stations to said host computer,*

*a controller for controlling the transfer of data between said host computer and at least one of said remote user stations in accordance with said forward and return channel protocols, said controller including circuitry for generating a multibit data packet containing source information to be transferred from said host computer, address information which identifies a unique one of the remote stations and length information which defines the length of information contained in said data packet, and*

*at least one of said remote user stations including circuitry for detecting said data packet at a uniquely addressed remote user station and for selecting source information contained in said packet in accordance with length information provided in said data packet.*

*43. The communication system as recited in claim 41 wherein said broadband communication medium is a medium selected from one of a cable network, an over-the-air RF signal and a direct satellite broadcast signal.*

*44. The communication system as recited in claim 42 wherein said broadband communication medium is a medium selected from one of a cable network, an over-the-air RF broadcast medium, and a direct satellite broadcast medium.*

*45. The communication system as recited in claim 41 wherein each of the forward and return channels of said asymmetric network is a selected one of a cable network, an over-the-air broadcast network and a direct broadcast satellite network.*

*46. The communication system as recited in claim 42 wherein each of the forward and return channels of said asymmetric network is a selected one of a cable network, an over-the-air broadcast network and a direct broadcast satellite network.*

*47. A multi-user computing system including an asymmetric network for providing two way interactive communication and that enables multi megabit per second transfers of data to a plurality of remote user stations connected to said asymmetric network, said system comprising:*

*a provider site,*

*a plurality of remote user stations,*

*a broadband CATV transmission facility including:*

*a cabling network for transferring information packets between said provider site and the remote user stations,*

*a high-speed link for connection with the provider site,*

*a digital signal encoder for converting digital signals from the provider site into standard baseband video input signals, and*

*a video modulator for receiving said baseband input signals thereby to produce a broadcast signal on a selected broadcast channel that is transmitted by said CATV transmission facility to said remote user stations,*

*wherein at least one of said remote user stations includes:*

*a computing system,*

*an RF modem including a TV tuner for receiving and automatically synchronizing to a selected broadcast channel of the video modulator of said broadband CATV transmission facility, and*

*an interface that interconnects said RF modem and said computing system, said interface including a microprocessor controller for defining a protocol for receiving information packets transmitted in a forward channel from said provider site to at least one of said remote user stations, for monitoring incoming information packets for a unique address associated with said remote user station, for forwarding information packets to said computing system for further processing upon detection of said unique address, and for transferring information from said remote user station to said provider site over a narrow band return channel that comprises a selected one of a telephone line, an over-the-air broadcast channel and a selected narrowband channel of said CATV transmission facility.*

*48. In combination with a multi-user computing system that includes an asymmetric network for providing two way interactive communication between a provider site and multiple remote user stations wherein at least one of said remote user stations has a unique address associated therewith and includes a computing system, the improvement comprising:*

*a broadband CATV transmission facility including:*

*a cabling network for transferring information packets between said provider site and the remote user stations,*

*a high-speed link for connection with said provider site,*

*a digital signal encoder for converting digital signals from the provider site into standard baseband input signals, and*

*a video modulator for receiving said baseband input signals thereby to produce a broadcast signal on a selected broadcast channel that is transmitted by said CATV transmission facility to said remote user stations, and*

*wherein at least one of said remote user stations includes:*

*an RF modem including a TV tuner for receiving and automatically synchronizing to a selected broadcast channel of the video modulator of said broadband CATV transmission facility, and*

*an interface that interconnects said RF modem and said computing system, said interface including a microprocessor controller for defining a protocol for receiving information packets transmitted in a forward channel from said provider site to the remote user station, for monitoring incoming packets for a unique address associated with said remote user station, for forwarding said information packets to said computing system for further processing upon detection of said unique address, and for transferring information from said computing system to said provider site over a narrow band return channel that comprises a selected one of a telephone line, an over-the-air broadcast and a selected narrowband channel of said CATV transmission facility.*

*49. A multi-user computing system including an asymmetric network for providing two way interactive communication, said system comprising:*

*a provider site,*

*a plurality of remote user stations,*

*a broadband CATV transmission facility including:*

*a cabling network for transferring information packets between said provider site and the remote user stations wherein said information packets include destination address information indicative of unique ones of said remote user stations,*

*a high-speed link with said provider site,*

*a digital signal encoder for converting digital signals from the provider site into standard baseband input signals,*

*a video modulator for receiving said baseband input signal thereby to produce a broadcast signal on a selected broadcast channel that is transmitted by said CATV transmission facility to said remote user stations,*

*return channel communication equipment for receiving information from at least one of said remote user stations and for transmitting at least some of said information to said provider site,*

*at least one of said remote user stations including,*

*a computing system,*

*an RF modem including a TV tuner for receiving and automatically synchronizing to a selected broadcast channel of the video modulator of said broadband CATV transmission facility, and*

*an interface that interconnects said RF modem and said computing system, said interface including a microprocessor controller for defining a protocol for receiving and selecting information packets transmitted in a forward channel from said provider site to the remote user station, and for transferring information from said computing system to said provider site over a narrow band return channel that comprises a selected one of a telephone line, an over-the-air broadcast and a selected narrow band channel of said CATV transmission facility.*

*50. A multi-user computing system including an asymmetric network for providing two way interactive communication, said system comprising:*

*a provider site,*

*a plurality of remote user stations wherein at least one of said remote user stations has a unique address,*

*a broadband CATV transmission facility including:*

*a cabling network for transferring information packets between said provider site and the remote user stations wherein said information packets include destination address information indicative of unique ones of said remote user stations and packet length information indicative of the length of said information packet,*

*a high-speed link with said provider site,*

*a data encryption system associated with the provider site,*

*a digital signal encoder for converting digital signals from the provider site into standard baseband input signals,*

*a video modulator for receiving said baseband input signal thereby to produce a broadcast signal on a selected broadcast channel that is transmitted by said CATV transmission facility to said remote user stations,*

*return channel communication equipment for receiving information from at least one of said remote user stations and for transmitting said information to said provider site,*

*at least one of said remote user stations including,*

*a computing system,*

*an RF modem including a TV tuner for receiving and automatically synchronizing to a selected broadcast channel of the video modulator of said broadband CATV transmission facility,*

*an interface that interconnects said RF modem and said computing system, said interface including*

*an encryption chip set for encrypting and decrypting information,*

*a microprocessor controller for defining a protocol for receiving information packets transmitted in a forward channel from said provider site to the remote user station, for instructing the tuner to monitor incoming packets for a unique address associated with said remote user station, for forwarding said information packets to said computing system for further processing upon detection of said unique address, and for transferring information from said computing system to said provider site over a narrow band return channel that comprises a selected one of a telephone line, an over-the-air broadcast and a selected narrowband channel of said CATV transmission facility.*

*51. A multi-user computing system including an asymmetric network for providing two way interactive communication that enables multi megabit per second transfers of data in an asymmetric network, said system comprising:*

*a provider site,*

*a plurality of remote user stations,*

*a broadband transmission facility including:*

*a signal transmission network for transferring information packets between said provider site and the remote user stations,*

*a high-speed link for connection with the provider site,*

*wherein at least one of said remote user stations includes:*

*a computing system,*

*a high speed modem for receiving multi-megabit per second information transfers, and*

*an interface that interconnects said high speed modem and said computing system, said interface including a microprocessor controller for defining a protocol for receiving and selecting information packets transmitted in a forward channel from said provider site to the computing system, and for transferring information from said computing system to said provider site over a narrow band return channel that comprises a selected one of a telephone line, an over-the-air broadcast and a selected narrowband channel of said broadband transmission facility.*

*52. In combination with a content provider site and at least one remote user station that includes a high speed modem for detecting data in multi megabit per second transfers of data in a broadband signal, a sending and receiving interface that enables communication between said high speed modem and a computing system, said interface being operative with a controller for effecting communication in a forward channel and a return channel in accordance with predefined protocols:*

*a broadband communication system for enabling two way interactive communication between said provider site and said at least one remote user station, said broadband communication system including*

*a high-speed link for connection with said provider site,*

*an asymmetric network for enabling two way communication in an asymmetric network configuration that enables multi megabit per second transfers of data to said at least one remote user station in accordance with a multi megabit per second forward channel protocol and that enables a lower speed transfer of data from said at least one remote user station in accordance with a lower speed return channel protocol, and*

*said at least one remote user station including an associated unique address and an associated demodulator which operates to detect said associated unique address by demodulating said broadband signal carrying multi megabit per second data.*

*53. The method as recited in claim 12, wherein the digital data flows through a router which is not a hybrid interface.*

*54. The system as recited in claim 16, where the return channel includes a router other than the remote link adapter.*

*55. The method as recited in claim 21, wherein the digital data flows from a remote site to the hybrid transmission facility through a router which is not a hybrid interface.*

* * * * *

UNITED STATES PATENT AND TRADEMARK OFFICE

CERTIFICATE OF CORRECTION

PATENT NO. : Re. 35,774
DATED : April 21, 1998
INVENTOR(S) : Moura et al

It is certified that error appears in the above-identified patent and that said Letters Patent is hereby corrected as shown below:

On the title page: Item [54] and Columm 1, line 3

Change title to "Data Transmission System and Method"
In column 1, line 47 delete "those techniques".
In column 1, line 54 change "diverting" to --delivering--.
In column 2, line 44 please change "decoder" to --encoder--.
In column 3, line 26 change "remote" to --return--.
In column 4, line 2 change "distal" to --digital--.
In column 4, line 39 insert a space before "F".
In column 4, line 45 insert --channel-- after "broadcast".
In column 5, line 27 change the second "the" to --these--.
In column 5, line 28 capitalize the word "information"
In column 6, line 25 change "ate" to --are--.
In column 6, line 49 change "DTB" to --DTE--.
In column 8, line 18 paragraph return after "equipment".
In column 8, line 57 add --of-- after "bandwidth".

Signed and Sealed this

Tenth Day of November 1998

Bruce Lehman

*Attest:*

BRUCE LEHMAN

*Attesting Officer*

*Commissioner of Patents and Trademarks*